(12) United States Patent
Zhou et al.

(10) Patent No.: US 9,285,938 B2
(45) Date of Patent: Mar. 15, 2016

(54) ORGANIC LIGHT-EMITTING DIODE PIXEL CIRCUIT, DRIVING METHOD THEREOF, AND DISPLAY DEVICE

(71) Applicants: BOE TECHNOLOGY GROUP CO., LTD., Beijing (CN); CHENGDU BOE OPTOELECTRONICS TECHNOLOGY CO., LTD., Chengdu, Sichuan Province (CN)

(72) Inventors: Quanguo Zhou, Beijing (CN); Xiaojing Qi, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan Province (CN)

( * ) Notice: Subject to any disclaimer, the term of this patent is extended or adjusted under 35 U.S.C. 154(b) by 139 days.

(21) Appl. No.: 14/369,393

(22) PCT Filed: Dec. 16, 2013

(86) PCT No.: PCT/CN2013/089518
§ 371 (c)(1),
(2) Date: Jun. 27, 2014

(87) PCT Pub. No.: WO2015/014077
PCT Pub. Date: Feb. 5, 2015

(65) Prior Publication Data
US 2015/0268763 A1 Sep. 24, 2015

(30) Foreign Application Priority Data
Jul. 31, 2013 (CN) .......................... 2013 1 0329850

(51) Int. Cl.
*G09G 3/30* (2006.01)
*G06F 3/044* (2006.01)
(Continued)

(52) U.S. Cl.
CPC .............. *G06F 3/044* (2013.01); *G06F 3/0412* (2013.01); *G09G 3/3208* (2013.01);
(Continued)

(58) Field of Classification Search
USPC ...................... 345/76–81, 173–178
See application file for complete search history.

(56) References Cited

U.S. PATENT DOCUMENTS

2006/0214893 A1 9/2006 Tseng et al.
2007/0290954 A1* 12/2007 Miyazawa ........... G09G 3/3233
345/76
(Continued)

FOREIGN PATENT DOCUMENTS

CN 101281446 A 10/2008
CN 101614893 A 12/2009
(Continued)

OTHER PUBLICATIONS

Chinese First Office Action dated Dec. 22, 2014 corresponding to application No. 201310329850.1.
(Continued)

*Primary Examiner* — Roy Rabindranath
(74) *Attorney, Agent, or Firm* — Nath, Goldberg & Meyer; Joshua B. Goldberg

(57) ABSTRACT

The present invention, provides an OLED pixel circuit, a driving method thereof and a display device. A first control unit of the OLED pixel circuit of the present invention is used for importing a power supply signal into a data writing unit and turning on an OLED and a driving unit; the data writing unit is used for importing a power supply voltage signal and a data line signal, and meanwhile for supplying voltage to the driving unit; a touch detecting unit is used for sensing touch and generating a detecting signal; the driving unit is used for converting the detecting signal into touch output signal which is output to a driving IC via the touch detecting unit and for providing drive current for the OLED; and a second control unit is used for connecting the driving unit to ground level.

20 Claims, 5 Drawing Sheets

(51) Int. Cl.
  *G06F 3/041* (2006.01)
  *G09G 3/32* (2006.01)
  *G09G 5/18* (2006.01)

(52) U.S. Cl.
  CPC .............. *G09G 3/3225* (2013.01); *G09G 5/18* (2013.01); *G09G 2300/0404* (2013.01); *G09G 2300/0842* (2013.01); *G09G 2310/0251* (2013.01); *G09G 2360/142* (2013.01)

(56) References Cited

U.S. PATENT DOCUMENTS

| | | | | |
|---|---|---|---|---|
| 2014/0327664 | A1* | 11/2014 | Kanda | G09G 3/3233 345/212 |
| 2015/0221255 | A1* | 8/2015 | Qing | G06F 3/0412 345/173 |
| 2015/0301674 | A1* | 10/2015 | Tan | G06F 3/044 345/173 |
| 2015/0302801 | A1* | 10/2015 | Tan | G06F 3/042 345/173 |

FOREIGN PATENT DOCUMENTS

| | | |
|---|---|---|
| CN | 101943974 A | 1/2011 |
| CN | 102341774 A | 2/2012 |
| CN | 102929460 A | 2/2013 |
| CN | 103135846 A | 6/2013 |
| CN | 103413524 A | 11/2013 |
| CN | 203502926 U | 3/2014 |
| KR | 20100010733 A | 2/2010 |
| KR | 20130029036 A | 3/2013 |

OTHER PUBLICATIONS

Search Report issued in International Application No. PCT/CN2013/089518, thirteen (13) pages.

* cited by examiner

ORGANIC LIGHT-EMITTING DIODE PIXEL CIRCUIT, DRIVING METHOD THEREOF, AND DISPLAY DEVICE

This is a National Phase Application filed under 35 U.S.C. 371 as a national stage of PCT/CN2013/089518, filed Dec. 16, 2013, and claims priority benefit from Chinese Application No. 201310329850.1, filed Jul. 31, 2013, the content of each of which is hereby incorporated by reference in its entirety.

FIELD OF THE INVENTION

The present invention relates to the field of touch display technology, and particularly, to an organic light-emitting diode (OLED) pixel circuit, a driving method thereof, and a display device.

DESCRIPTION OF THE RELATED ART

Touch screen, as one of the simplest, most convenient, and most natural human-machine interactive devices, has been widely applied in various electronic products, such as mobile phones, notebook computers, digital cameras and the like. Touch screens, according to the installation techniques, may be classified into two types, namely, external touch screens and in-cell touch screens. An external touch screen is formed by, on a display panel, arranging a touch device, which generally includes a touchpad disposed on the display panel and a protection layer (e.g. diamond glass) and the touch screen operates based on the changes in light or pressure sensed by the touchpad.

In an in-cell touch screen, the function of a touchpad to sense signals is embedded in a pixel circuit, and with a control circuit provided, the display screen is capable of sensing touch signals.

The inventors found that at least the following problems exist in the prior art: for an in-cell touch screen, as the function of the touchpad to sense signals is embedded in the pixel circuit, its control circuit and manufacturing process are relatively complicated, which is unfavorable for improving production yield and production efficiency. In addition, for the in-cell touch screen, its pixel aperture ratio may be decreased, which further results in degraded display quality of display screen.

SUMMARY OF THE INVENTION

The present invention provides an OLED pixel circuit whose control circuit and manufacturing process are relatively simple, a driving method thereof and a display device, aiming to the problems in the prior art that the control circuit and manufacturing process of an in-cell touch screen are relatively complicated, which is unfavorable for improving production yield and production efficiency.

A technical solution used to solve the technical problem of the present invention is an OLED pixel circuit, comprising:

a data writing unit, a driving unit, an OLED, a first control unit, a second control unit and a touch detecting unit; wherein, the first control unit, in a touch detecting stage and an OLED light-emitting stage, is used for importing a power supply voltage signal into the data writing unit under the control of a scanning line, and, in the OLED light-emitting stage, is used for turning on the OLED and the driving unit;

the data writing unit, in the touch detecting stage and the OLED light-emitting stage, is used for importing the power supply voltage signal under the control of a first light-emitting control line, and importing a data line signal under the control of the scanning line and a second light-emitting control line, and meanwhile is used for supplying voltage to the driving unit;

the touch detecting unit, in the touch detecting stage, is used for sensing touch under the control of a touch signal level control line, and generating a detecting signal;

the driving unit, in the touch detecting stage, is used for converting the detecting signal into a touch output signal, which is output to a driving IC via the touch detecting unit, under the control of the touch signal level control line, and, in the OLED light-emitting stage, is used for providing driving current for the OLED; and the second control unit, in the OLED light-emitting stage, is used for connecting the driving unit to a ground level under the control of a third light-emitting control line.

Preferably, an anode of the OLED is connected to a power supply.

Preferably, the data writing unit comprises a first thin film transistor (TFT), a third TFT, a fifth TFT, a storage capacitor and a first capacitor; wherein, a gate of the first TFT is connected to the first light-emitting control line, and a drain of the first TFT is connected to a second terminal of the storage capacitor;

a gate of the third TFT is connected to the scanning line, a source of the third TFT is connected to a data line, and a drain of the third TFT is connected to a first terminal of the storage capacitor;

a gate of the fifth TFT is connected to the second light-emitting control line, a source of the fifth TFT is connected to the drain of the third TFT, and a drain of the fifth TFT is connected to the driving unit;

a first terminal of the first capacitor is connected to the first terminal of the storage capacitor, and a second terminal of the first capacitor is grounded.

Preferably, the first control unit comprises a second TFT, a gate of the second TFT is connected to the scanning line, a source of the second TFT is connected to a cathode of the OLED, and a drain of the second TFT is connected to a source of the first TFT in the data writing unit.

Preferably, the driving unit comprises a fourth TFT, and a gate of the fourth TFT is connected to the second terminal of the storage capacitor and the drain of the first TFT in the data writing unit, and a source of the fourth TFT is connected to the drain of the second TFT.

Preferably, the second control unit comprises a sixth TFT, a drain of the sixth TFT is grounded, a gate of the sixth TFT is connected to the third light-emitting control line, and a source of the sixth TFT is connected to the drain of the fifth TFT in the data writing unit.

Preferably, the touch detecting unit comprises a photodiode, a seventh TFT, an eighth TFT and a ninth TFT, wherein, a cathode of the photodiode is connected to both the gate of the fourth TFT and the second terminal of the storage capacitor in the data writing unit, and an anode of the photodiode is connected to a source of the seventh TFT;

a drain of the seventh TFT is grounded, and a gate of the seventh TFT is connected to the touch signal level control line;

a source of the eighth TFT is connected to the drain of the fourth TFT, a drain of the eighth TFT is connected to a sensor line, and a gate of the eighth TFT is connected to the touch signal level control line; and a source of the ninth TFT is connected to a power supply line, a drain of the ninth TFT is connected to the source of the first TFT in the data writing unit, and a gate of the ninth TFT is connected to the touch signal level control line.

Preferably, the first TFT and the second TFT are P-type TFTs, the third TFT, the fourth TFT, the fifth TFT, the sixth TFT, the seventh TFT, the eighth TFT and the ninth TFT are N-type TFTs; or the first TFT, the second TFT and the fourth TFT are N-type TFTs, the third TFT, the fifth TFT, the sixth TFT, the seventh TFT, the eighth TFT and the ninth TFT are P-type TFTs.

Preferably, the first to ninth TFTs are any one of polycrystalline silicon TFT, monocrystalline silicon TFT, oxide TFT and organic TFT.

Preferably, the OLED is a top-emitting OLED.

The OLED pixel circuit of the present invention comprises the photodiode, which renders the display screen capable of directly sensing a signal generated by a touch, such that the control circuit of the pixel and the manufacturing process are simplified, which further improves production efficiency and production yield, and most importantly, helps to reduce production cost. Meanwhile, the OLED pixel circuit of the present invention can compensate for non-uniformity of the threshold voltage of a TFT, thus improving picture uniformity of the organic light emitting display. In addition, omitting two layers of indium tin oxide films in production process can effectively improve light transmittance, thus improving display quality of the display screen.

The present invention also provides a display device, which comprises the above-mentioned OLED pixel circuit.

The display device of the present invention includes the above OLED pixel circuit, and accordingly, it is thinner in overall thickness, lighter in weight, and lower in production cost. By providing the above circuit in each sub-pixel, sensitivity of the display screen to a touch may be significantly improved, and furthermore, as the photodiode works by sensing the change of light, floating touch can be achieved on the display screen.

A technical solution used to solve the technical problem of the present invention is to provide a driving method of the above OLED pixel circuit, and the driving method comprises a touch detecting stage and an OLED light-emitting stage, wherein, the touch detecting stage comprises:

the scanning line controlling the second TFT to be turned on, and controlling the third TFT to be turned off, the first light-emitting control line controlling the first TFT to be turned on, the second light-emitting control line controlling the fifth TFT to be turned off, the third light-emitting control line controlling the sixth TFT to be turned off, the touch signal level control line controlling the touch detecting unit to be turned off, and power supply signal being transferred to the second terminal of the storage capacitor;

the scanning line controlling the second TFT to be turned off, and controlling the third TFT to be turned on, the data line being at a high level, the touch signal level control line controlling the touch detecting unit to be turned off, the first light-emitting control line controlling the first TFT to be turned off, the second light-emitting control line controlling the fifth TFT to be turned off, the third light-emitting control line controlling the sixth TFT to be turned off, and the data line signal being transferred to the first terminal of the storage capacitor; and the scanning line controlling the second TFT to be turned on, and controlling the third TFT to be turned off, the touch signal level control line controlling the touch detecting unit to be turned on, the first light-emitting control line controlling the first TFT to be turned off, the second light-emitting control line controlling the fifth TFT to be turned off, the third light-emitting control line controlling the sixth TFT to be turned off, the power supply signal being transferred to the drain of the fourth TFT, and current flowing through the fourth TFT being transferred to the driving IC, and in the OLED light-emitting stage, the touch signal level control line controls the touch detecting unit to be turned off, and the OLED light-emitting stage comprises:

the scanning line controlling the second TFT to be turned on, and controlling the third TFT to be turned off, the first light-emitting control line controlling the first TFT to be turned on, the second light-emitting control line controlling the fifth TFT to be turned off, the third light-emitting control line controlling the sixth TFT to be turned off, and the fourth TFT going into saturation state;

the scanning line controlling the second TFT to be turned off, and controlling the third TFT to be turned on, the first light-emitting control line controlling the first TFT to be turned on, the second light-emitting control line controlling the fifth TFT to be turned on, the third light-emitting control line controlling the sixth TFT to be turned off, and the data line signal being transferred to the first terminal of the storage capacitor; and the scanning line controlling the second TFT to be turned on, and controlling the third TFT to be turned off, the first light-emitting control line controlling the first TFT to be turned off, the second light-emitting control line controlling the fifth TFT to be turned off, the third light-emitting control line controlling the sixth TFT to be turned on, and the fourth TFT driving the OLED to emit light.

The driving method of the OLED pixel circuit of the present invention has less control signals, simple timing, and an easy-to-implement circuit, and is convenient and practical.

Figure 1:
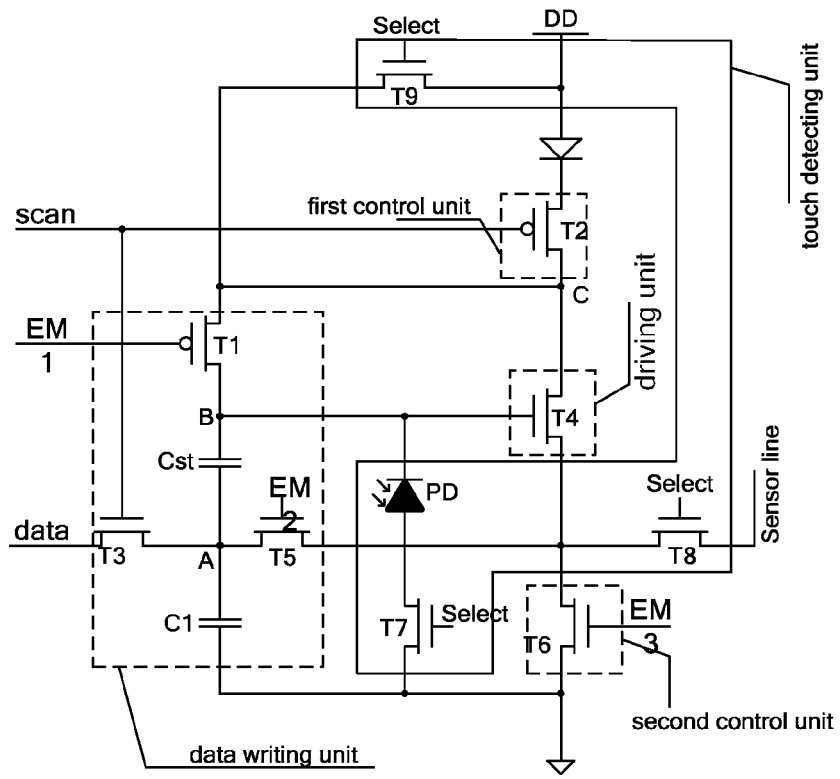
FIGS. 1 and 3 are schematic diagrams of OLED pixel circuits of Embodiment 1 of the present invention.

Reference numerals are: T1: first TFT; T2: second TFT; T3: third TFT; T4: fourth TFT; T5: fifth TFT; T6: sixth TFT; T7: seventh TFT; T8: eighth TFT; T9: ninth TFT; PD: photodiode; OLED: OLED; DD: power supply line; EM1: a first light-emitting control line; EM2: a second light-emitting control line; EM3: a third light-emitting control line; scan: scanning line; data: data line; select: touch signal level control line; Cst: storage capacitor; C1: first capacitor; sensor line: sensor line.

DETAILED DESCRIPTION OF THE PREFERRED EMBODIMENTS

To provide a better understanding of the technical solutions of the present invention for the person skilled in the art, the present invention will be further described in detail in conjunction with the accompanying drawings and specific implementations.

Embodiment 1

This embodiment provides an OLED pixel circuit, which comprises:

a data writing unit, a driving unit, an OLED, a first control unit, a second control unit and a touch detecting unit; wherein, the first control unit, in a touch detecting stage and an OLED light-emitting stage, is used for importing a power supply voltage signal into the data writing unit under the control of a scanning line, and, in the OLED light-emitting stage, is used for turning on the OLED and the driving unit;

the data writing unit, in the touch detecting stage and the OLED light-emitting stage, is used for importing the power supply voltage signal under the control of a first light-emitting control line, and importing a data line signal under the control of the scanning line and a second light-emitting control line, and meanwhile is used for supplying voltage to the driving unit;

the touch detecting unit, in the touch detecting stage, is used for sensing touch under the control of a touch signal level control line, and generating a detecting signal;

the driving unit, in the touch detecting stage, is used for converting the detecting signal into a touch output signal, which is output to a driving IC via the touch detecting unit, under the control of the touch signal level control line, and, in the OLED light-emitting stage, is used for providing driving current for the OLED; and the second control unit, in the OLED light-emitting stage, is used for connecting the driving unit to a ground level under the control of a third light-emitting control line.

In this embodiment, as shown in FIG. 1, preferably, the data writing unit comprises a first TFT T1, a third TFT T3, a fifth TFT T5, a storage capacitor Cst and a first capacitor C1; the driving unit comprises a fourth TFT T4; the first control unit comprises a second TFT T2; the second control unit comprises a sixth TFT T6; the touch detecting unit comprises a photodiode PD, a seventh TFT T7, an eighth TFT T8 and a ninth TFT T9.

Specifically, an anode of the OLED OLED is connected to the power supply line DD. Further preferably, the OLED OLED is a top-emitting OLED.

For the storage capacitor Cst, its first terminal is connected to a first terminal of the first capacitor C1 whose second terminal is grounded.

For the first TFT T1, its gate is connected to the first light-emitting control line EM1, and its drain is connected to a second terminal of the storage capacitor Cst.

For the second TFT T2, its gate is connected to the scanning line, its source is connected to a cathode of the OLED OLED, and its drain is connected to a source of the first TFT T1.

For the third TFT T3, its gate is connected to the scanning line, its source is connected to the data line, and its drain is connected to both the first terminal of the storage capacitor Cst and the first terminal of the first capacitor C1.

For the fourth TFT T4, its gate is connected to both the second terminal of the storage capacitor Cst and the drain of the first TFT T1, and its source is connected to the drain of the second TFT T2.

For the fifth TFT T5, its gate is connected to the second light-emitting control line EM2, its source is connected to the drain of the third TFT T3, and its drain is connected to a drain of the fourth TFT T4.

For the sixth TFT T6, its drain is grounded, its gate is connected to the third light-emitting control line EM3, and its source is connected to both the drain of the fifth TFT T5 and the drain of the fourth TFT T4.

For the photodiode PD, its cathode is connected to both the gate of the fourth TFT T4 and the second terminal of the storage capacitor Cst, and its anode is connected to a source of the seventh TFT T7.

For the seventh TFT T7, its drain is grounded, and its gate is connected to the touch signal level control line.

For the eighth TFT T8, its source is connected to the drain of the fourth TFT T4, its drain is connected to the sensor line, and its gate is connected to the touch signal level control line.

For the ninth TFT T9, its source is connected to the power supply line DD, its drain is connected to the source of the first TFT T1, and its gate is connected to the touch signal level control line.

In this embodiment, the first TFT T1 and the second TFT T2 are preferably P-type TFTs, and the third TFT T3, the fourth TFT T4, the fifth TFT T5, the sixth TFT T6, the seventh TFT T7, the eighth TFT T8 and the ninth TFT T9 are preferably N-type TFTs.

Figure 3:
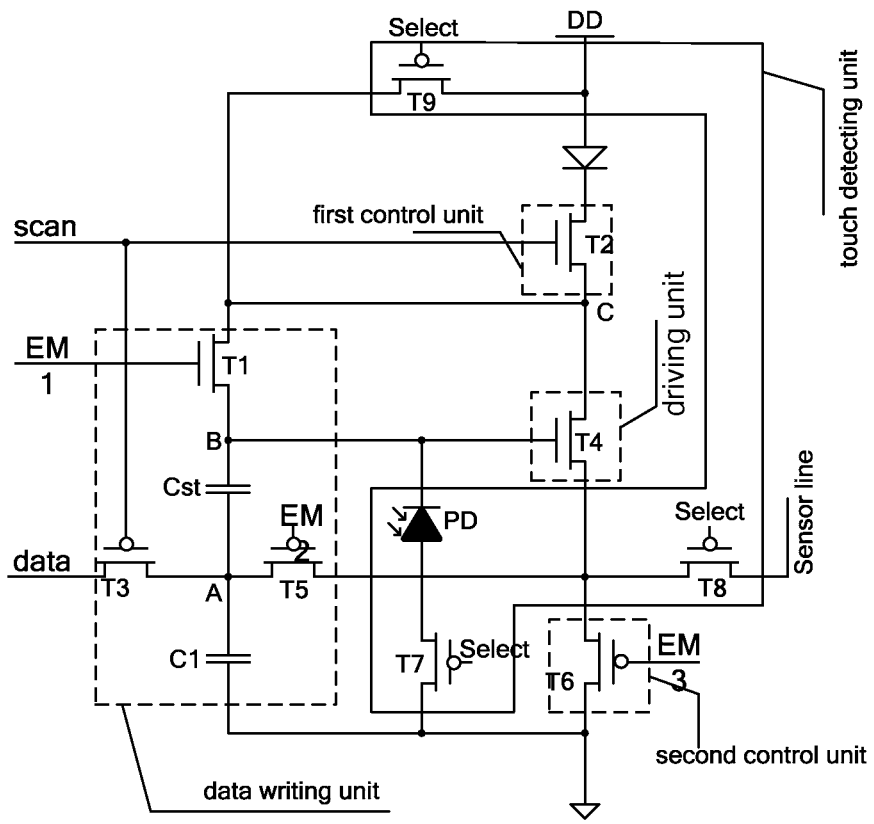
Figure 4:
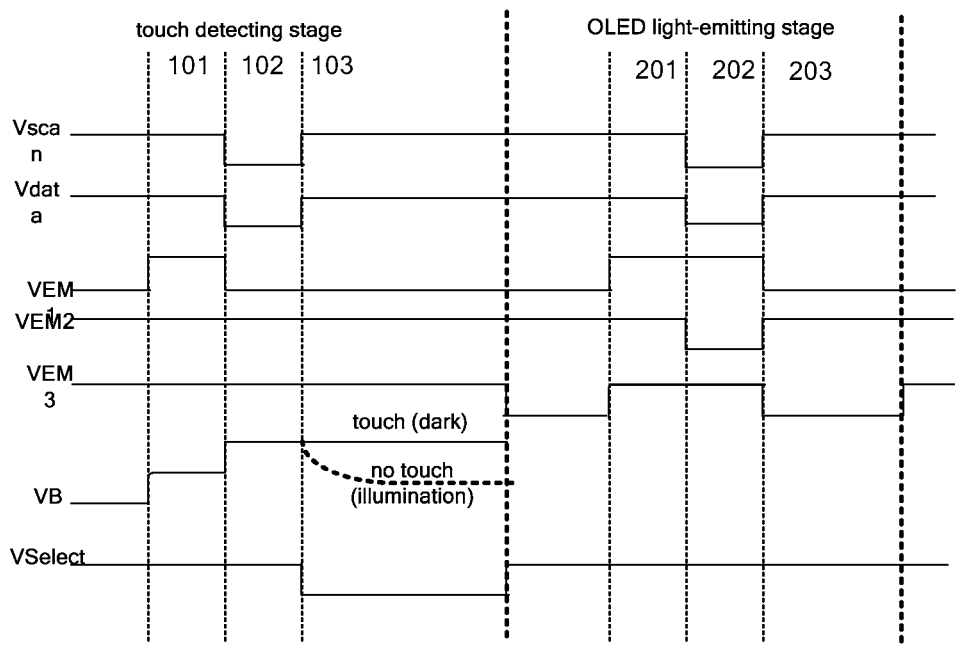

It should be noted that, in this embodiment, the first TFT, the second TFT and the fourth TFT may be N-type TFTs, while the third TFT, the fifth TFT, the sixth TFT, the seventh TFT, the eighth TFT and the ninth TFT may be P-type TFTs. In this condition, the circuit diagram of the pixel circuit is shown in FIG. 3, and accordingly, its timing diagram is shown in FIG. 4.

Obviously, by accordingly changing the control level and the type of a TFT, the on/off function of the TFT may be achieved. For example, the fifth TFT is turned on under the control of a high level when it is an N-type TFT; alternatively, the fifth TFT may be a P-type TFT which is turned on under the control of a low level. According to this concept, the types of the respective TFTs, which are controlled by the same level control signal, in a certain unit of this embodiment may be changed, as long as this unit can achieve its original function without influencing the original functions of the other devices, and in this condition the object of the present invention may also be achieved.

Preferably, each TFT is any one of polycrystalline silicon TFT, monocrystalline silicon TFT, oxide TFT and organic TFT.

The OLED pixel circuit of this embodiment comprises the photodiode, which renders the display screen capable of directly sensing a signal generated by a touch, such that the control circuit of the pixel and the manufacturing process are simplified, which further improves production efficiency and production yield, and most importantly, helps to reduce production cost. Meanwhile, the OLED pixel circuit of the present invention can compensate for non-uniformity of the threshold voltage of a TFT, thus improving picture uniformity of an organic light emitting display. In addition, using a top-emitting OLED may help to improve aperture ratio of pixel and omitting two layers of indium tin oxide films in production process may effectively improve light transmittance, thus improving display quality of the display screen.

Figure 2:
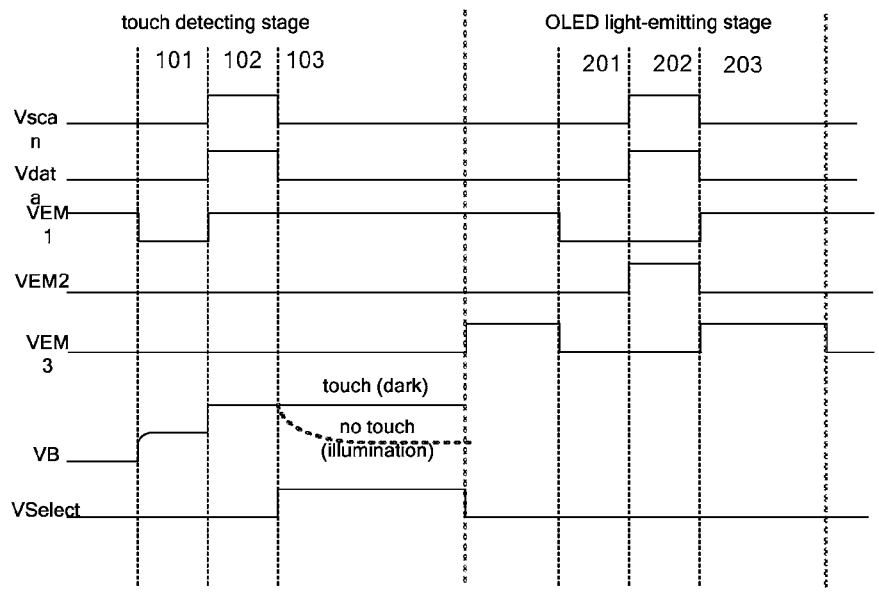
FIGS. 2 and 4 are timing diagrams for driving the OLED pixel circuits of Embodiment 1 of the present invention.

In conjunction with FIG. 1, a driving method of the OLED pixel circuit comprises a touch detecting stage and an OLED light-emitting stage, as shown in FIG. 2, and its working process is as below.

Stage 1: Touch Detecting Stage, which Specifically Comprises the Phases 101 to 104.

Figure 5:
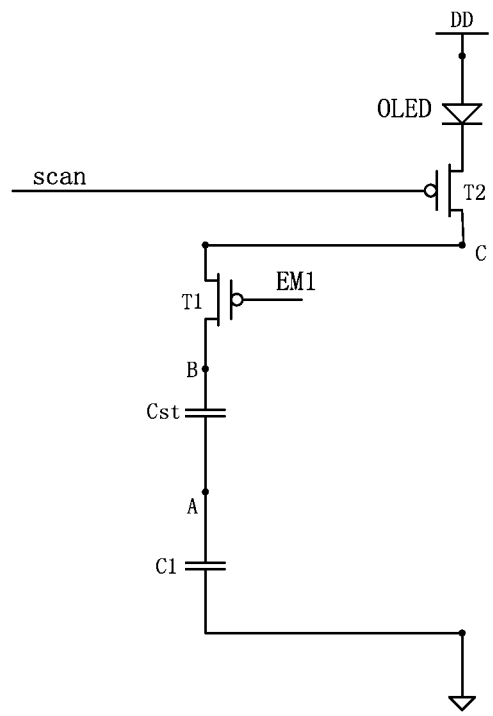
FIG. 5 is an equivalent circuit diagram of an OLED pixel circuit of Embodiment 1 of the present invention in an initialization phase of a touch detecting stage.

Phase 101 is an initialization phase, and its corresponding equivalent circuit diagram is illustrated in FIG. 5. In this phase, the scanning line is at a low level, which controls the second TFT T2 to be turned on, and controls the third TFT T3 to be turned off; the first light-emitting control line EM1 is at a low level, which controls the first TFT T1 to be turned on; the second light-emitting control line EM2 is at a low level, which controls the fifth TFT T5 to be turned off; the third light-emitting control line EM3 is at a low level, which controls the sixth TFT T6 to be turned off; and the touch signal level control line controls the touch detecting unit to be turned off.

Accordingly, the power supply signal is transferred to the second terminal of the storage capacitor Cst via the OLED OLED, the second TFT T2 and the first TFT T1, so as to charge the storage capacitor Cst, and the voltage at Point B is VDD-Vtholed, VDD is the power supply line voltage and Vtholed is the turn-on voltage of the OLED OLED.

Figure 6:
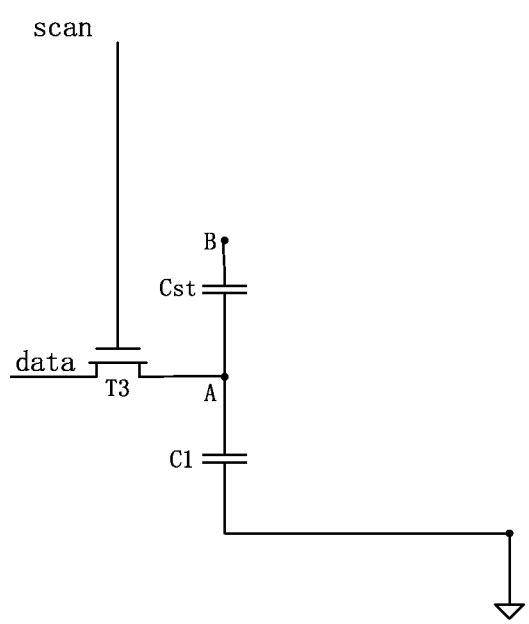
FIG. 6 is an equivalent circuit diagram of the OLED pixel circuit of Embodiment 1 of the present invention in a data line signal writing phase of the touch detecting stage.

Phase 102 is a data line signal writing phase, and its corresponding equivalent circuit diagram is illustrated in FIG. 6. In this phase, the scanning line is at a high level, which controls the second TFT T2 to be turned off, and controls the third TFT T3 to be turned on; the touch signal level control line is at a low level, which controls the touch detecting unit to be turned off; the first light-emitting control line EM1 is at a high level, which controls the first TFT T1 to be turned off; the second light-emitting control line EM2 is at a low level, which controls the fifth TFT T5 to be turned off; the third light-emitting control line EM3 is at a low level, which controls the sixth TFT T6 to be turned off. At this point, Point B is floating, the data line signal is written into point A via the third TFT T3, and transferred to the first terminal of the storage capacitor Cst, such that the voltage at point B is increased to Vdata+VDD-Vtholed, and Vdata is the data line voltage.

Figure 7:
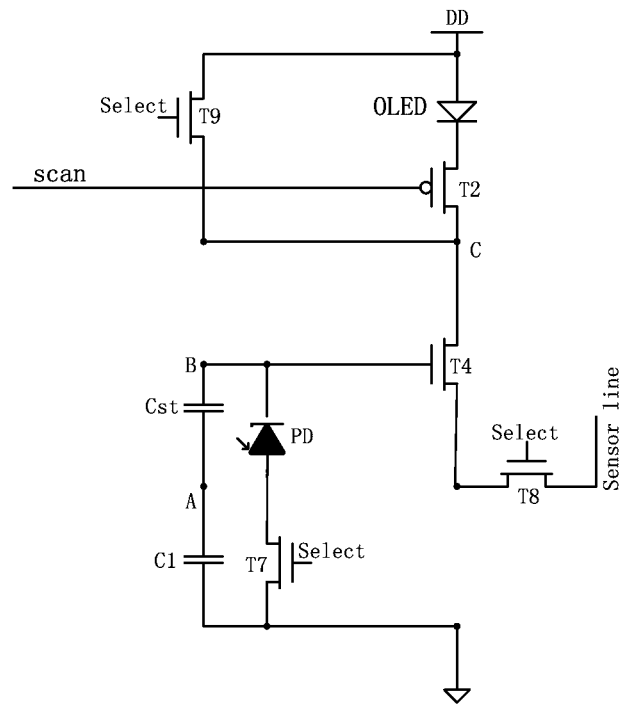
FIG. 7 is an equivalent circuit diagram of the OLED pixel circuit of Embodiment 1 of the present invention in a touch-generating signal detecting phase of the touch detecting stage.

Phase 103 is a touch-generating signal detecting phase, and its corresponding equivalent circuit diagram is illustrated in FIG. 7. In this phase, the scanning line scan is at a low level, which controls the second TFT T2 to be turned on, and controls the third TFT T3 to be turned off; the touch signal level control line is at a high level, which controls the touch detecting unit to be turned on; the first light-emitting control line EM1 is at a high level, which controls the first TFT T1 to be turned off; the second light-emitting control line EM2 is at a low level, which controls the fifth TFT T5 to be turned off; the third light-emitting control line EM3 is at a low level, which controls the sixth TFT T6 to be turned off.

Accordingly, the power supply signal is written into Point C via the ninth TFT T9, the voltage of the source of the fourth TFT T4 which is connected to the point C is VDD, and the voltage at point B is Vdata+VDD-Vtholed. At this point, if the photodiode PD is under illumination, the charges in the storage capacitor Cst are greatly decreased due to the leakage current resulting from the illuminated photodiode PD, and consequently, the voltage at point B is greatly reduced, which may result in reduced current flowing through the fourth TFT T4. If the photodiode PD is under a touch (at this condition, light is weakened or eliminated), compared to the condition that the photodiode PD is under illumination, the photodiode PD generates little or no leakage current (that is, a detecting signal is detected), and accordingly, the current flowing through the fourth TFT T4 is slightly reduced or keeps unchanged. The above current (that is, the touch output signal) flowing through the fourth TFT T4 may flow though the eighth TFT T8, and then be transmitted to the driving IC (not shown in FIG. 1) for detection and analysis via the sensor line.

Stage 2: OLED Light-Emitting Stage

During this stage, the touch signal level control line controls the touch detecting unit to be turned off, and this stage specifically comprises the phases 201 to 203.

Figure 8:
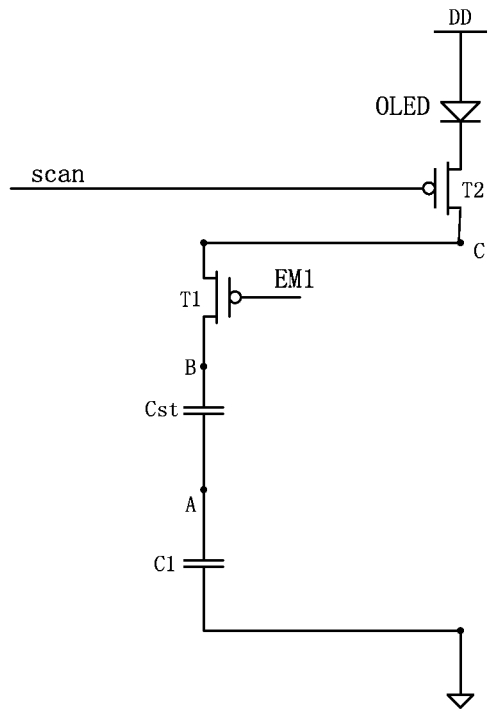
FIG. 8 is an equivalent circuit diagram of an OLED pixel circuit of Embodiment 1 of the present invention in an initialization phase of an OLED light-emitting stage.

Phase 201 is a pre-charging phase, and its corresponding equivalent circuit diagram is illustrated in FIG. 8. In this phase, the scanning line is at a low level, which controls the second TFT T2 to be turned on, and controls the third TFT T3 to be turned off; the first light-emitting control line EM1 is at a low level, which controls the first TFT T1 to be turned on; the second light-emitting control line EM2 is at a low level, which controls the fifth TFT T5 to be turned off; the third light-emitting control line EM3 is at a low level, which controls the sixth TFT T6 to be turned off; the fourth TFT T4 goes into saturation state, and is essentially equivalent to a diode.

Figure 9:
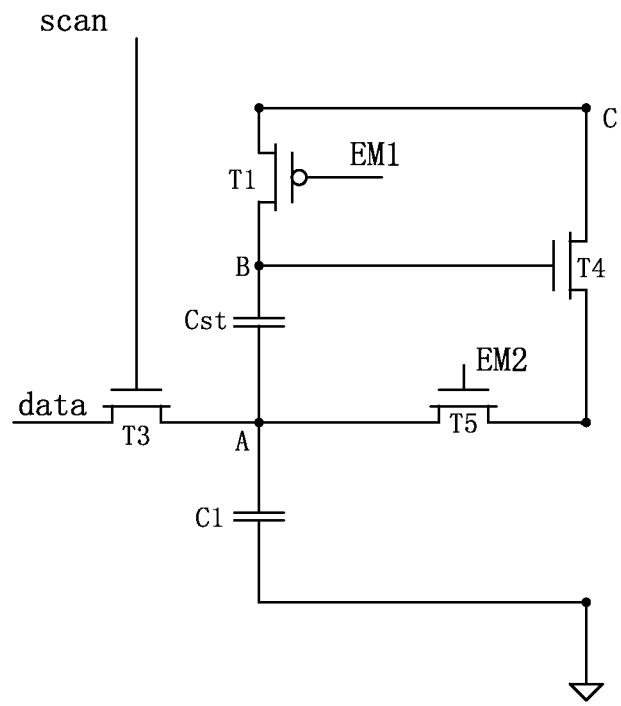
FIG. 9 is an equivalent circuit diagram of an OLED pixel circuit of Embodiment 1 of the present invention in a data line signal writing phase of the OLED light-emitting stage.

Phase 202 is a data line signal writing phase, and its corresponding equivalent circuit diagram is illustrated in FIG. 9. In this stage, the scanning line is at a high level, which controls the second TFT T2 to be turned off, and controls the third TFT T3 to be turned on; the first light-emitting control line EM1 is at a low level, which controls the first TFT T1 to be turned on; the second light-emitting control line EM2 is at a high level, which controls the fifth TFT T5 to be turned on; the third light-emitting control line EM3 is at a low level, which controls the sixth TFT T6 to be turned off. At this point, as the fourth TFT T4 is a diode that has been in saturation state, the data line signal is transferred to the first terminal of the storage capacitor Cst, and the voltage drop of the storage capacitor Cst is the threshold voltage Vth4 of the fourth TFT T4 whose gate is at a voltage of Vdata+Vth4, and whose drain is connected to the first terminal of the storage capacitor Cst and at a voltage of Vdata.

Figure 10:
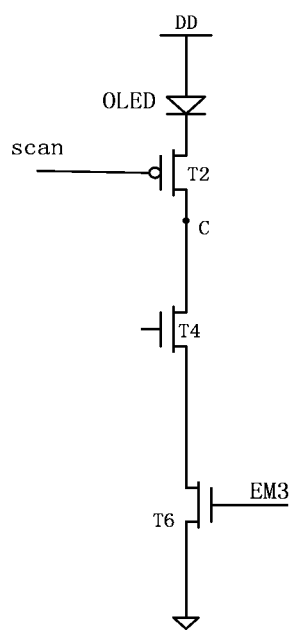
FIG. 10 is an equivalent circuit diagram of an OLED pixel circuit of Embodiment 1 of the present invention in the OLED light-emitting phase of the OLED light-emitting stage.

Phase 203 is an OLED light-emitting phase, and its corresponding equivalent circuit diagram is illustrated in FIG. 10. In this stage, the scanning line is at a low level, which controls the second TFT T2 to be turned on, and controls the third TFT T3 to be turned off; the first light-emitting control line EM1 is at a high level, which controls the first TFT T1 to be turned off; the second light-emitting control line EM2 is at a low level, which controls the fifth TFT T5 to be turned off; the third light-emitting control line EM3 is at a high level, which controls the sixth TFT T6 to be turned on. At this point, the drain of the fourth TFT T4 is grounded, and voltage of the gate of the fourth TFT T4 is still Vdata+Vth4, that is, the gate-to-source voltage Vgs of the fourth TFT T4 is equal to Vdata+Vth4. Meanwhile, the current flowing through the fourth TFT T4 is the same as the current flowing through the OLED OLED, and may be represented as:

$$I = k(Vgs - Vth4)^2 = k(Vdata + Vth4 - Vth4)^2 = k(Vdata)^2$$

It can be known from the above formula that this current is independent of both the threshold voltage Vth4 of the fourth TFT T4 and the voltage between the two terminals of the OLED OLED, which basically eliminates the influence caused by non-uniformity and drift of the threshold voltage and non-uniformity of the electrical performance of the OLED OLED. As a result, the current flowing through the fourth TFT T4 is uniform, thereby the current flowing through the OLED OLED is also uniform. As the OLED is a current mode light-emitting device, the OLED has an uniform brightness, thus improving brightness uniformity of picture of the organic light-emitting display screen.

It should be noted that the data line voltage Vdata in phase 202 may vary in a range, that is, any data line voltage within the certain range may allow the fourth TFT T4 to drive the OLED to emit light.

It should also be noted that during operation of the OLED pixel circuit, as response of the pixel circuit to input signals is made promptly, the time spent on switching between the above stage 1 and the stage 2 is extraordinary short, that is, detecting the touch-generating signal and then driving the OLED to emit light so as to display desired contents are completed in a very short period of time.

The above-described driving method of the OLED pixel circuit has less control signals, simple timing, and an easy-to-implement circuit, and is convenient and practical.

Embodiment 2

This embodiment provides a display device, which comprises the above-described OLED pixel circuit, and of course comprises other known structures such as a substrate. The display device may be an OLED display device or a product or component with display function, such as a mobile phone, a tablet computer, a television, a display, a notebook computer, a digital frame or a navigator, which uses OLED display technique.

The display device of this embodiment comprises the above-described OLED pixel circuit, and therefore, it is thinner in overall thickness, lighter in weight, and lower in production cost. By providing the above circuit in each sub-pixel, sensitivity of the display screen to a touch may be significantly improved, and furthermore, as the photodiode works by sensing changes of light, floating touch can be achieved on the display screen.

It should be understood that the above implementations are merely exemplary implementations used for explaining the principle of the present invention, but the present invention is not limited thereto. For the person skilled in the art, various variations and improvements may be made without departing from the spirit and essence of the present invention. These variations and improvements are also deemed as the protection scope of the present invention.

In the embodiments of the present invention, among the above-described technical features, some technical features may be omitted to solve only a part of the technical problems existing in the prior art. Furthermore, the disclosed technical features may be arbitrarily combined. The protection scope of the present invention is defined by the appended claims and its equivalents, those skilled in the art may make various variations and combinations to the technical solutions disclosed in the appended claims.

What is claimed is:

1. An organic light emitting dioxide (OLED) pixel circuit, comprising a data writing unit, a driving unit, an OLED, a first control unit, a second control unit and a touch detecting unit, wherein, the first control unit, in a touch detecting stage and an OLED light-emitting stage, is used for importing a power supply voltage signal into the data writing unit under the control of a scanning line, and, in the OLED light-emitting stage, is used for turning on the OLED and the driving unit;

the data writing unit, in the touch detecting stage and the OLED light-emitting stage, is used for importing the power supply voltage signal under the control of a first light-emitting control line, and importing a data line signal under the control of the scanning line and a second light-emitting control line, and meanwhile is used for supplying voltage to the driving unit;

the touch detecting unit, in the touch detecting stage, is used for sensing touch under the control of a touch signal level control line, and generating a detecting signal;

the driving unit, in the touch detecting stage, is used for converting the detecting signal into a touch output signal, which is output to a driving integrated circuit (IC) via the touch detecting unit, under the control of the touch signal level control line, and in the OLED light-emitting stage, is used for providing driving current for the OLED; and the second control unit, in the OLED light-emitting stage, is used for connecting the driving unit to a ground level under the control of a third light-emitting control line.

2. The OLED pixel circuit of claim 1, wherein an anode of the OLED is connected to a power supply.

3. The OLED pixel circuit of claim 2, wherein the data writing unit comprises: a first thin film transistor (TFT), a third TFT, a fifth TFT, a storage capacitor and a first capacitor, wherein, a gate of the first TFT is connected to the first light-emitting control line, and a drain of the first TFT is connected to a second terminal of the storage capacitor;

a gate of the third TFT is connected to the scanning line, a source of the third TFT is connected to a data line, and a drain of the third TFT is connected to a first terminal of the storage capacitor;

a gate of the fifth TFT is connected to the second light-emitting control line, a source of the fifth TFT is connected to the drain of the third TFT, and a drain of the fifth TFT is connected to the driving unit; and a first terminal of the first capacitor is connected to the first terminal of the storage capacitor, and a second terminal of the first capacitor is grounded.

4. The OLED pixel circuit of claim 3, wherein the first control unit comprises a second TFT, a gate of the second TFT is connected to the scanning line, a source of the second TFT is connected to a cathode of the OLED, and a drain of the second TFT is connected to a source of the first TFT in the data writing unit.

5. The OLED pixel circuit of claim 4, wherein the driving unit comprises a fourth TFT, and a gate of the fourth TFT is connected to the second terminal of the storage capacitor and the drain of the first TFT in the data writing unit, and a source of the fourth TFT is connected to the drain of the second TFT.

6. The OLED pixel circuit of claim 5, wherein the second control unit comprises a sixth TFT, a drain of the sixth TFT is grounded, a gate of the sixth TFT is connected to the third light-emitting control line, and a source of the sixth TFT is connected to the drain of the fifth TFT in the data writing unit.

7. The OLED pixel circuit of claim 6, wherein the touch detecting unit comprises a photodiode, a seventh TFT, an eighth TFT and a ninth TFT, wherein, a cathode of the photodiode is connected to both the gate of the fourth TFT and the second terminal of the storage capacitor in the data writing unit, and an anode of the photodiode is connected to a source of the seventh TFT;

a drain of the seventh TFT is grounded, and a gate of the seventh TFT is connected to the touch signal level control line;

a source of the eighth TFT is connected to the drain of the fourth TFT, a drain of the eighth TFT is connected to a sensor line, and a gate of the eighth TFT is connected to the touch signal level control line; and a source of the ninth TFT is connected to a power supply line, a drain of the ninth TFT is connected to the source of the first TFT in the data writing unit, and a gate of the ninth TFT is connected to the touch signal level control line.

8. The OLED pixel circuit of claim 7, wherein the first TFT and the second TFT are P-type TFTs, the third TFT, the fourth TFT, the fifth TFT, the sixth TFT, the seventh TFT, the eighth TFT and the ninth TFT are N-type TFTs; or the first TFT, the second TFT and the fourth TFT are N-type TFTs, the third TFT, the fifth TFT, the sixth TFT, the seventh TFT, the eighth TFT and the ninth TFT are P-type TFTs.

9. The OLED pixel circuit of claim 7, wherein the first to ninth TFTs are any one of polycrystalline silicon TFT, monocrystalline silicon TFT, oxide TFT and organic TFT.

10. A driving method of the OLED pixel circuit of claim 7, the method comprising a touch detecting stage and an OLED light-emitting stage, wherein, the touch detecting stage comprises:
the scanning line controlling the second TFT to be turned on, and controlling the third TFT to be turned off, the first light-emitting control line controlling the first TFT to be turned on, the second light-emitting control line controlling the fifth TFT to be turned off, the third light-emitting control line controlling the sixth TFT to be turned off, the touch signal level control line controlling the touch detecting unit to be turned off, and power supply signal being transferred to the second terminal of the storage capacitor;

the scanning line controlling the second TFT to be turned off, and controlling the third TFT to be turned on, the data line being at a high level, the touch signal level control line controlling the touch detecting unit to be turned off, the first light-emitting control line controlling the first TFT to be turned off, the second light-emitting control line controlling the fifth TFT to be turned off, the third light-emitting control line controlling the sixth TFT to be turned off, and the data line signal being transferred to the first terminal of the storage capacitor; and the scanning line controlling the second TFT to be turned on, and controlling the third TFT to be turned off, the touch signal level control line controlling the touch detecting unit to be turned on, the first light-emitting control line controlling the first TFT to be turned off, the second light-emitting control line controlling the fifth TFT to be turned off, the third light-emitting control line controlling the sixth TFT to be turned off, the power supply signal being transferred to the drain of the fourth TFT, and current flowing through the fourth TFT being transferred to the driving IC, and in the OLED light-emitting stage, the touch signal level control line controls the touch detecting unit to be turned off, and the OLED light-emitting stage comprises:
the scanning line controlling the second TFT to be turned on, and controlling the third TFT to be turned off, the first light-emitting control line controlling the first TFT to be turned on, the second light-emitting control line controlling the fifth TFT to be turned off, the third light-emitting control line controlling the sixth TFT to be turned off, and the fourth TFT going into saturation state;

the scanning line controlling the second TFT to be turned off, and controlling the third TFT to be turned on, the first light-emitting control line controlling the first TFT to be turned on, the second light-emitting control line controlling the fifth TFT to be turned on, the third light-emitting control line controlling the sixth TFT to be turned off, and the data line signal being transferred to the first terminal of the storage capacitor; and the scanning line controlling the second TFT to be turned on, and controlling the third TFT to be turned off, the first light-emitting control line controlling the first TFT to be turned off, the second light-emitting control line controlling the fifth TFT to be turned off, the third light-emitting control line controlling the sixth TFT to be turned on, and the fourth TFT driving the OLED to emit light.

11. The OLED pixel circuit of claim 1, wherein the OLED is a top-emitting OLED.

12. A display device, comprising an organic light emitting dioxide (OLED) pixel circuit, comprising a data writing unit, a driving unit, an OLED, a first control unit, a second control unit and a touch detecting unit, wherein, the first control unit, in a touch detecting stage and an OLED light-emitting stage, is used for importing a power supply voltage signal into the data writing unit under the control of a scanning line, and, in the OLED light-emitting stage, is used for turning on the OLED and the driving unit;

the data writing unit, in the touch detecting stage and the OLED light-emitting stage, is used for importing the power supply voltage signal under the control of a first light-emitting control line, and importing a data line signal under the control of the scanning line and a second light-emitting control line, and meanwhile is used for supplying voltage to the driving unit;

the touch detecting unit, in the touch detecting stage, is used for sensing touch under the control of a touch signal level control line, and generating a detecting signal;

the driving unit, in the touch detecting stage, is used for converting the detecting signal into a touch output signal, which is output to a driving integrated circuit (IC) via the touch detecting unit, under the control of the touch signal level control line, and in the OLED light-emitting stage, is used for providing driving current for the OLED; and the second control unit, in the OLED light-emitting stage, is used for connecting the driving unit to a ground level under the control of a third light-emitting control line.

13. The display device of claim 12, wherein an anode of the OLED is connected to a power supply.

14. The display device of claim 13, wherein the data writing unit comprises: a first thin film transistor (TFT), a third TFT, a fifth TFT, a storage capacitor and a first capacitor, wherein, a gate of the first TFT is connected to the first light-emitting control line, and a drain of the first TFT is connected to a second terminal of the storage capacitor;

a gate of the third TFT is connected to the scanning line, a source of the third TFT is connected to a data line, and a drain of the third TFT is connected to a first terminal of the storage capacitor;

a gate of the fifth TFT is connected to the second light-emitting control line, a source of the fifth TFT is connected to the drain of the third TFT, and a drain of the fifth TFT is connected to the driving unit; and a first terminal of the first capacitor is connected to the first terminal of the storage capacitor, and a second terminal of the first capacitor is grounded.

15. The display device of claim 14, wherein the first control unit comprises a second TFT, a gate of the second TFT is connected to the scanning line, a source of the second TFT is connected to a cathode of the OLED, and a drain of the second TFT is connected to a source of the first TFT in the data writing unit.

16. The display device of claim 15, wherein the driving unit comprises a fourth TFT, and a gate of the fourth TFT is connected to the second terminal of the storage capacitor and the drain of the first TFT in the data writing unit, and a source of the fourth TFT is connected to the drain of the second TFT.

17. The display device of claim 16, wherein the second control unit comprises a sixth TFT, a drain of the sixth TFT is grounded, a gate of the sixth TFT is connected to the third light-emitting control line, and a source of the sixth TFT is connected to the drain of the fifth TFT in the data writing unit.

18. The display device of claim 17, wherein the touch detecting unit comprises a photodiode, a seventh TFT, an eighth TFT and a ninth TFT, wherein,
a cathode of the photodiode is connected to both the gate of the fourth TFT and the second terminal of the storage capacitor in the data writing unit, and an anode of the photodiode is connected to a source of the seventh TFT;
a drain of the seventh TFT is grounded, and a gate of the seventh TFT is connected to the touch signal level control line;
a source of the eighth TFT is connected to the drain of the fourth TFT, a drain of the eighth TFT is connected to a sensor line, and a gate of the eighth TFT is connected to the touch signal level control line; and
a source of the ninth TFT is connected to a power supply line, a drain of the ninth TFT is connected to the source of the first TFT in the data writing unit, and a gate of the ninth TFT is connected to the touch signal level control line.

19. The display device of claim 18, wherein the first TFT and the second TFT are P-type TFTs, the third TFT, the fourth TFT, the fifth TFT, the sixth TFT, the seventh TFT, the eighth TFT and the ninth TFT are N-type TFTs; or
the first TFT, the second TFT and the fourth TFT are N-type TFTs, the third TFT, the fifth TFT, the sixth TFT, the seventh TFT, the eighth TFT and the ninth TFT are P-type TFTs.

20. The display device of claim 18, wherein the first to ninth TFTs are any one of polycrystalline silicon TFT, monocrystalline silicon TFT, oxide TFT and organic TFT.

* * * * *